United States Patent
Sago et al.

(10) Patent No.: US 8,746,866 B2
(45) Date of Patent: Jun. 10, 2014

(54) INK SET, INK-JET RECORDING APPARATUS, AND INK-JET RECORDING METHOD

(75) Inventors: Hiromitsu Sago, Tokai (JP); Masashi Tsuda, Ichinomiya (JP); Shunichi Higashiyama, Yokkaichi (JP); Kazuma Goto, Nagoya (JP); Akihiko Taniguchi, Kakamigahara (JP); Narumi Koga, Nagoya (JP); Michiko Aoyama, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 75 days.

(21) Appl. No.: 13/075,501

(22) Filed: Mar. 30, 2011

(65) Prior Publication Data

US 2011/0292116 A1    Dec. 1, 2011

(30) Foreign Application Priority Data

May 31, 2010   (JP) .................................. 2010-124457

(51) Int. Cl.
*B41J 2/01* (2006.01)
*B41J 2/21* (2006.01)

(52) U.S. Cl.
CPC ..................................... *B41J 2/2114* (2013.01)
USPC ........................................... 347/96; 347/100

(58) Field of Classification Search
CPC .......... B41J 2/01; B41J 2/2114; B41J 2/2107; C09D 11/30; C09D 11/322; C09D 11/005; C09D 11/54
USPC .......... 347/95–100, 21, 28; 106/31.13, 31.27, 106/31.6; 523/160, 161; 160/31.13, 31.27, 160/31.6
See application file for complete search history.

(56) References Cited

U.S. PATENT DOCUMENTS

| | | | |
|---|---|---|---|
| 4,890,126 | A | 12/1989 | Hotomi |
| 5,609,671 | A | 3/1997 | Nagasawa |
| 5,837,045 | A | 11/1998 | Johnson et al. |
| 6,084,619 | A | 7/2000 | Takemoto et al. |
| 6,261,349 | B1 | 7/2001 | Nagai et al. |
| 6,261,353 | B1 | 7/2001 | Doi et al. |
| 6,270,212 | B1 | 8/2001 | Kasumi et al. |
| 6,286,953 | B1 | 9/2001 | Takemoto et al. |
| 6,536,890 | B1 | 3/2003 | Kato et al. |
| 6,540,314 | B1 | 4/2003 | Sanada et al. |

(Continued)

FOREIGN PATENT DOCUMENTS

| | | |
|---|---|---|
| JP | 08-003498 | 1/1996 |
| JP | 08-020720 | 1/1996 |

(Continued)

OTHER PUBLICATIONS

EP Extended Search Report dated Oct. 7, 2011 corresponding Application No. 11160739.6.

(Continued)

*Primary Examiner* — Matthew Luu
*Assistant Examiner* — Rut Patel
(74) *Attorney, Agent, or Firm* — Banner & Witcoff, Ltd.

(57) ABSTRACT

An ink set containing a water-based ink for ink jet recording and a treatment liquid. The water-based ink contains a phosphate group-modified self-dispersing pigment, water, and a water-soluble organic solvent. The treatment liquid contains a monovalent metal ion, water, and a water-soluble organic solvent.

15 Claims, 2 Drawing Sheets

(56) References Cited

U.S. PATENT DOCUMENTS

| | | |
|---|---|---|
| 6,637,859 B2 | 10/2003 | Williamson et al. |
| 6,863,391 B2 | 3/2005 | Tomioka et al. |
| 7,040,747 B2 | 5/2006 | Kubota et al. |
| 7,621,630 B2 | 11/2009 | Ito et al. |
| 2001/0035897 A1 | 11/2001 | Hayashi et al. |
| 2002/0044185 A1 | 4/2002 | Koitabashi et al. |
| 2002/0044187 A1 | 4/2002 | Koitabashi et al. |
| 2002/0077386 A1 | 6/2002 | Kurabayashi et al. |
| 2004/0244645 A1 | 12/2004 | Doi et al. |
| 2005/0012798 A1 | 1/2005 | Adachi et al. |
| 2005/0157131 A1 | 7/2005 | Iinuma |
| 2006/0023042 A1 | 2/2006 | Doi |
| 2006/0098068 A1* | 5/2006 | Hakamada et al. ........... 347/100 |
| 2006/0197814 A1* | 9/2006 | Doi ............................... 347/100 |
| 2006/0238589 A1 | 10/2006 | Koga et al. |
| 2006/0238590 A1 | 10/2006 | Koga et al. |
| 2006/0293410 A1 | 12/2006 | Tokita et al. |
| 2007/0022902 A1 | 2/2007 | Koga |
| 2007/0054981 A1 | 3/2007 | Yanagi et al. |
| 2007/0100023 A1 | 5/2007 | Burns et al. |
| 2007/0100024 A1 | 5/2007 | Gu et al. |
| 2007/0176995 A1 | 8/2007 | Kadomatsu et al. |
| 2007/0186812 A1 | 8/2007 | Koga et al. |
| 2007/0247504 A1 | 10/2007 | Koganehira et al. |
| 2007/0252881 A1 | 11/2007 | Sanada et al. |
| 2008/0012887 A1 | 1/2008 | Maeno et al. |
| 2008/0105160 A1* | 5/2008 | Doi et al. ..................... 106/31.6 |
| 2008/0239036 A1 | 10/2008 | Hattori |
| 2008/0241398 A1 | 10/2008 | Kato et al. |
| 2008/0246820 A1 | 10/2008 | Silverbrook |
| 2009/0229489 A1 | 9/2009 | Gu |
| 2009/0234067 A1 | 9/2009 | Kariya |
| 2009/0237442 A1 | 9/2009 | Yamanobe |
| 2009/0295892 A1 | 12/2009 | Akiyama et al. |
| 2009/0304927 A1 | 12/2009 | Kamibayashi et al. |
| 2010/0040782 A1 | 2/2010 | Arai et al. |
| 2011/0227996 A1 | 9/2011 | Ikoshi |
| 2012/0092413 A1 | 4/2012 | Kawamura |

FOREIGN PATENT DOCUMENTS

| | | |
|---|---|---|
| JP | 08-174997 | 7/1996 |
| JP | 08-193175 | 7/1996 |
| JP | 09-207424 | 8/1997 |
| JP | 10-129114 | 5/1998 |
| JP | 10-250216 | 9/1998 |
| JP | 11-115303 | 4/1999 |
| JP | 11-343435 | 12/1999 |
| JP | 2000-198222 | 7/2000 |
| JP | 2000-513396 | 10/2000 |
| JP | 2001-162817 | 6/2001 |
| JP | 2001-353861 | 12/2001 |
| JP | 2002-079740 | 3/2002 |
| JP | 2002-086707 | 3/2002 |
| JP | 2002-103783 | 4/2002 |
| JP | 2002-201385 | 7/2002 |
| JP | 2004-359841 | 12/2004 |
| JP | 2005205611 A | 8/2005 |
| JP | 2006089559 A | 4/2006 |
| JP | 2007-179136 | 7/2007 |
| JP | 2007-230232 | 9/2007 |
| JP | 2007-261203 | 10/2007 |
| JP | 2008-213388 | 9/2008 |
| JP | 2008-230161 | 10/2008 |
| JP | 2008-246821 | 10/2008 |
| JP | 2009-515007 | 4/2009 |
| JP | 2009214445 A | 9/2009 |
| JP | 2009-220527 | 10/2009 |
| JP | 2009-297924 | 12/2009 |
| JP | 2009286116 A | 12/2009 |
| WO | 2007/053563 A2 | 5/2007 |

OTHER PUBLICATIONS

EP Extended Search Report dated Oct. 7, 2011, corresponding Application No. 11160737.0.

Office Action dated Jan. 24, 2014 for corresponding Japanese Patent Application No. 2010-124457 with partial translation.

* cited by examiner

INK SET, INK-JET RECORDING APPARATUS, AND INK-JET RECORDING METHOD

CROSS-REFERENCE TO RELATED APPLICATION

This application claims priority from Japanese Patent Application No. 2010-124457 filed on May 31, 2010. The entire subject matter of the Japanese Patent Applications is incorporated herein by reference.

BACKGROUND

There is a case that ink-jet recording is performed using a treatment liquid that contains a polyvalent metal ion such as a calcium ion ($Ca^{2+}$) in order to increase an optical density (an OD value) of a recorded object. The polyvalent metal ion contained in the treatment liquid can cause a self-dispersing pigment in a water-based ink to aggregate, resulting in increasing an optical density (an OD value) of the recorded object.

However, in an ink-jet recording method using a conventional treatment liquid, a polyvalent metal ion in the treatment liquid causes generation of insoluble salt, resulting in nozzle clogging in an ink-jet head or a blockage of a flow path of the treatment liquid in an ink-jet recording apparatus.

SUMMARY

An ink set comprises: a water-based ink for ink jet recording; and a treatment liquid. The water-based ink comprises a self-dispersing pigment obtained by modifying a pigment by a phosphate group (hereinafter, also referred to as "phosphate group-modified self-dispersing pigment"), water, and a water-soluble organic solvent, and the treatment liquid comprises a monovalent metal ion, water, and a water-soluble organic solvent.

An ink-jet recording apparatus comprises: an ink set storing portion; a treatment liquid applying unit; and an ink-jet head. The ink set storing portion stores the above-mentioned ink set, a treatment liquid in the ink set is applied to a recording medium by the treatment liquid applying unit, and a water-based ink in the ink set is ejected on the recording medium from the ink-jet head.

An ink-jet recording method comprises: a treatment step of applying a treatment liquid to a recording medium; and a recording step of performing recording by ejecting a water-based ink on the recording medium using an ink-jet system. As the water-based ink, the water-based ink in the above-mentioned ink set is used, and as the treatment liquid, the treatment liquid in the above-mentioned ink set is used.

DETAILED DESCRIPTION

As mentioned above, the ink set comprises a water-based ink for ink jet recording (hereinafter also merely referred to as "water-based ink" or "ink") and a treatment liquid.

The water-based ink comprises a phosphate group-modified self-dispersing pigment, water, and a water-soluble organic solvent. The phosphate group-modified self-dispersing pigment functions as a coloring agent, for example. The phosphate group-modified self-dispersing pigment may be prepared by treating a pigment described below by a method described in JP 2009-515007 A, for example. As the phosphate group-modified self-dispersing pigment, a commercially available product may be used. The water-based ink may or may not contain a polymer pigment dispersant. In the case where the water-based ink contains a polymer pigment dispersant, the amount of the polymer pigment dispersant to be contained may be an amount by which a viscosity of the water-based ink is not influenced. Since the water-based ink contains a self-dispersing pigment as mentioned above, the water-based ink does not have a problem in viscosity increase caused by a polymer pigment dispersant and may be superior in ejection stability and storing stability.

Examples of a pigment that may be used as a raw material of the phosphate group-modified self-dispersing pigment include carbon black, an inorganic pigment, and an organic pigment. Examples of the carbon black include furnace black, lamp black, acetylene black, and channel black. Examples of the inorganic pigment include inorganic pigments of titanium oxide, iron oxide, and carbon black. Examples of the organic pigment include: azo pigments such as azo lake, an insoluble azo pigment, a condensed azo pigment, and a chelate azo pigment; polycyclic pigments such as a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment; dye lake pigments such as a basic dye lake pigment and an acidic dye lake pigment; a nitro pigment; a nitroso pigment; and an aniline black daylight fluorescent pigment. Examples of the pigment other than these pigments include: C.I. Pigment Black 1, 6, and 7; C.I. Pigment Yellow 1, 2, 3, 12, 13, 14, 15, 16, 17, 55, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C.I. Pigment Violet 196; C.I. Pigment Blue 1, 2, 3, 15, 15:1, 15:2, 15:3, 15:4, 16, 22, and 60; and C.I. Pigment Green 7 and 36. A commercially available product that is suitable as the pigment that is a raw material of the phosphate group-modified self-dispersing pigment may be, for example, carbon black such as "MA8" or "MA100" manufactured by Mitsubishi Chemical Corporation or "Color Black FW200" manufactured by Evonik Degussa GmbH. The modification by a phosphate group may be performed by treating these pigments by a conventional method.

The amount of solid content of the phosphate group-modified self-dispersing pigment to be added with respect to the total amount of the water-base ink (the amount of solid content of pigment in the water-based ink) is not particularly limited, and may be set suitably depending on a desired optical density or coloration, for example. The amount of solid content of pigment in the water-based ink is, for example, in the range of 0.1 wt % to 20 wt %, 1 wt % to 10 wt %, and 2 wt % to 8 wt %.

The water-based ink may further contain, as a coloring agent, other pigments and dyes besides the phosphate group-modified self-dispersing pigment.

The water used for the water-based ink may be ion-exchange water or purified water. The amount of the water to be added with respect to the total amount of the water-based ink (the proportion of the water in the water-based ink) is, for example, in the range of 10 wt % to 90 wt %, and 40 wt % to 80 wt %. The proportion of the water in the water-based ink may be a balance of the other components, for example.

Examples of the water-soluble organic solvent used for the water-based ink include: a humectant that prevents a water-based ink from drying at a nozzle tip portion of an ink-jet head; and a penetrant that adjusts a drying rate of a water-based ink on a recording medium.

The humectant is not particularly limited, and examples thereof include lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketone such as acetone; keto alcohol such as diacetone alcohol; ethers such as tetrahydrofuran and dioxane; polyalcohols such as polyalkylene glycol, alkylene glycol, and glycerin; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, butylene glycol, diethylene glycol, triethylene glycol, dipropylene glycol, tripropylene glycol, thiodiglycol, and hexylene glycol. These humectants may be used alone or in a combination of two or more of them. Out of these, the humectant may be polyalcohol such as alkylene glycol or glycerin.

The amount of the humectant to be added with respect to the total amount of the water-based ink is, for example, in the range of 0 wt % to 95 wt %, 5 wt % to 80 wt %, and 5 wt % to 50 wt %.

Examples of the penetrant include glycol ethers. Examples of the glycol ethers include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. The penetrants may be used alone or in a combination of two or more of them.

The amount of the penetrant to be added with respect to the total amount of the water-based ink is, for example, in the range of 0 wt % to 20 wt %, 0.1 wt % to 15 wt %, and 0.5 wt % to 10 wt %.

The water-based ink may further contain a conventionally known additive as required. Examples of the additive include a surfactant, a pH adjuster, a viscosity modifier, a surface tension modifier, and a mildew proofing agent. Examples of the viscosity modifier include polyvinyl alcohol, cellulose, and a water-soluble resin.

The water-based ink may be prepared by uniformly mixing a phosphate group-modified self-dispersing pigment, water, a water-soluble organic solvent, and other components to be added as required by a conventionally known method, and then removing precipitates with a filter or the like, for example.

The treatment liquid comprises water, a water-soluble organic solvent, and a monovalent metal ion.

The water used for the treatment liquid may be ion-exchange water or purified water. The amount of water to be added with respect to the total amount of the treatment liquid may be a balance of the other components, for example.

As the water-soluble organic solvent used for the treatment liquid, a conventionally known water-soluble organic solvent may be used. Examples of the water-soluble organic solvent include polyvalent alcohol, a derivative thereof, alcohol, amide, ketone, keto alcohol, ether, a nitrogen-containing solvent, a sulfur-containing solvent, propylene carbonate, ethylene carbonate, and 1,3-dimethyl-2-imidazolidinone. Examples of the polyvalent alcohol include glycerin, ethylene glycol, triethylene glycol, polyethylene glycol, dipropylene glycol, tripropylene glycol, polypropylene glycol, trimethylolpropane, 1,5-pentanediol, and 1,2,6-hexanetriol. Examples of the derivative of the polyvalent alcohol include ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Examples of the alcohol include methyl alcohol, ethyl alcohol, n-propyl alcohol, isopropyl alcohol, n-butyl alcohol, sec-butyl alcohol, isobutyl alcohol, tert-butyl alcohol, and benzyl alcohol. Examples of the amide include dimethylformamide and dimethylacetamide. The ketone may be, for example, acetone. The keto alcohol may be, for example, diacetone alcohol. Examples of the ether include tetrahydrofuran and dioxane. Examples of the nitrogen-containing solvent include pyrrolidone, 2-pyrrolidone, N-methyl-2-pyrrolidone, cyclohexyl pyrrolidone, and triethanolamine Examples of the sulfur-containing solvent include thiodiethanol, thiodiglycol, thiodiglycerol, sulfolane, and dimethyl sulfoxide. The amount of the water-soluble organic solvent to be added with respect to the total amount of the treatment liquid is not particularly limited. These water-soluble organic solvents may be used alone or in a combination of two or more of them.

The monovalent metal ion has a function to cause a phosphate group-modified self-dispersing pigment in the water-based ink to aggregate when the water-based ink contacts with the treatment liquid on a recording medium. Examples of the monovalent metal ion include a sodium ion, a potassium ion, and a lithium ion. The method for adding the monovalent metal ion to the treatment liquid is not particularly limited, and, for example, the monovalent metal ion may be added as a salt composed of the monovalent metal ion and an anion that is to be a counterion of the monovalent metal ion. The anion is not particularly limited, and examples thereof include a chloride ion, a nitrate ion, a sulfate ion, a bromide ion, an iodide ion, an acetate ion, an oxalate ion, a citrate ion, a benzoate ion, a lactate ion, and a chlorate ion. Examples of the salt include sodium chloride, sodium nitrate, sodium sulfate, sodium bromide, sodium iodide, sodium acetate, sodium citrate, potassium chloride, potassium nitrate, potassium sulfate, potassium bromide, potassium iodide, potassium oxalate, potassium benzoate, lithium chloride, lithium nitrate, and lithium sulfate. The amount of the monovalent metal ion to be added with respect to the total amount of the treatment liquid (the proportion of the monovalent metal ion in the treatment liquid) is, for example, in the range of 0.5 wt % to 10 wt %, 0.5 wt % to 8 wt %, and 1.5 wt % to 8 wt %. When the proportion of the monovalent metal ion in the treatment liquid is greater than 5 wt %, an effect of increasing an optical density (an OD value) of a recorded object is the same as in the case where the proportion of the same is 5 wt %. Therefore, in view of the cost, the upper limit of the proportion of the monovalent metal ion in the treatment liquid may be 5 wt %. In the ink set, a monovalent metal ion is used for the treatment liquid as substitute for a conventional polyvalent metal ion such as a calcium ion or the like. Therefore, there is no risk of generating an insoluble salt. Further, an optical density (an OD value) of a recorded object may be increased because a phosphate group-modified self-dispersing pigment in the water-based ink is aggregated because of a monovalent metal ion.

The treatment liquid may or may not contain a coloring agent. In the case where the treatment liquid contains a coloring agent, the amount of the coloring agent may be an amount by which a recorded image is not influenced.

The treatment liquid may further contain a conventionally known additive as required. Examples of the additive include a surfactant, a pH adjuster, a viscosity modifier, a surface tension modifier, an antioxidant, and a mildew proofing agent. Examples of the viscosity modifier include polyvinyl alcohol, cellulose, and a water-soluble resin.

The treatment liquid may be prepared by uniformly mixing water, a water-soluble organic solvent, a monovalent metal ion, and other components to be added as required by a conventionally known method.

The ink set may be provided as an ink cartridge. For example, the ink cartridge includes an ink storing portion and a treatment liquid storing portion. The ink storing portion stores the above-mentioned water-based ink, and the treatment liquid storing portion stores the above-mentioned treatment liquid. The ink cartridge may further include a portion for storing a water-based ink other than the above-mentioned water-based ink.

The ink cartridge may be an ink cartridge assembly obtained by assembling a water-based ink cartridge and a treatment liquid cartridge which are formed individually, or may be an integrated ink cartridge obtained by integrating the ink storing portion and the treatment liquid storing portion.

Next, the ink-jet recording apparatus and the ink-jet recording method are described.

The ink-jet recording method may be performed using, for example, the above-mentioned ink-jet recording apparatus. The recording includes recording of letters; images; printing; and the like.

In the ink-jet recording apparatus, the ink-jet head may also serve as the treatment liquid applying unit. In the treatment step of the ink-jet recording method, a treatment liquid may be applied to a recording medium by ejecting the treatment liquid using an ink-jet system. The ink set that does not cause generation of an insoluble salt is used in the ink-jet recording apparatus and the ink-jet recording method. Therefore, for example, when the treatment liquid is ejected using the ink-jet head, the ink-jet head is prevented from nozzle clogging. In the ink-jet recording apparatus and the ink-jet recording method, the treatment liquid may be applied by, for example, stamp coating, brush coating, or roller coating. In this case, an insoluble salt is not generated in the treatment liquid. Therefore, uneven coating caused by the insoluble salt is prevented, it becomes possible to evenly coat the treatment liquid, and also, it becomes possible to prevent a blockage of a flow path of a treatment liquid in an ink-jet recording apparatus.

The ink set that does not cause generation of an insoluble salt is used in the ink-jet recording apparatus. Therefore, the ink-jet head may be an ink-jet head with a thermal ink-jet system. Similarly, in the ink-jet recording method, the ink-jet system may be a thermal ink-jet system. In the thermal ink-jet system, the treatment liquid and the water-based ink are ejected by foam pressure generated by heating the treatment liquid and the water-based ink. In the ink-jet recording apparatus and the ink-jet recording method, for example, an ink-jet system such as an electrostatic suction system or a piezo-element system may be employed as substitute for the thermal ink-jet system.

Figure 1:
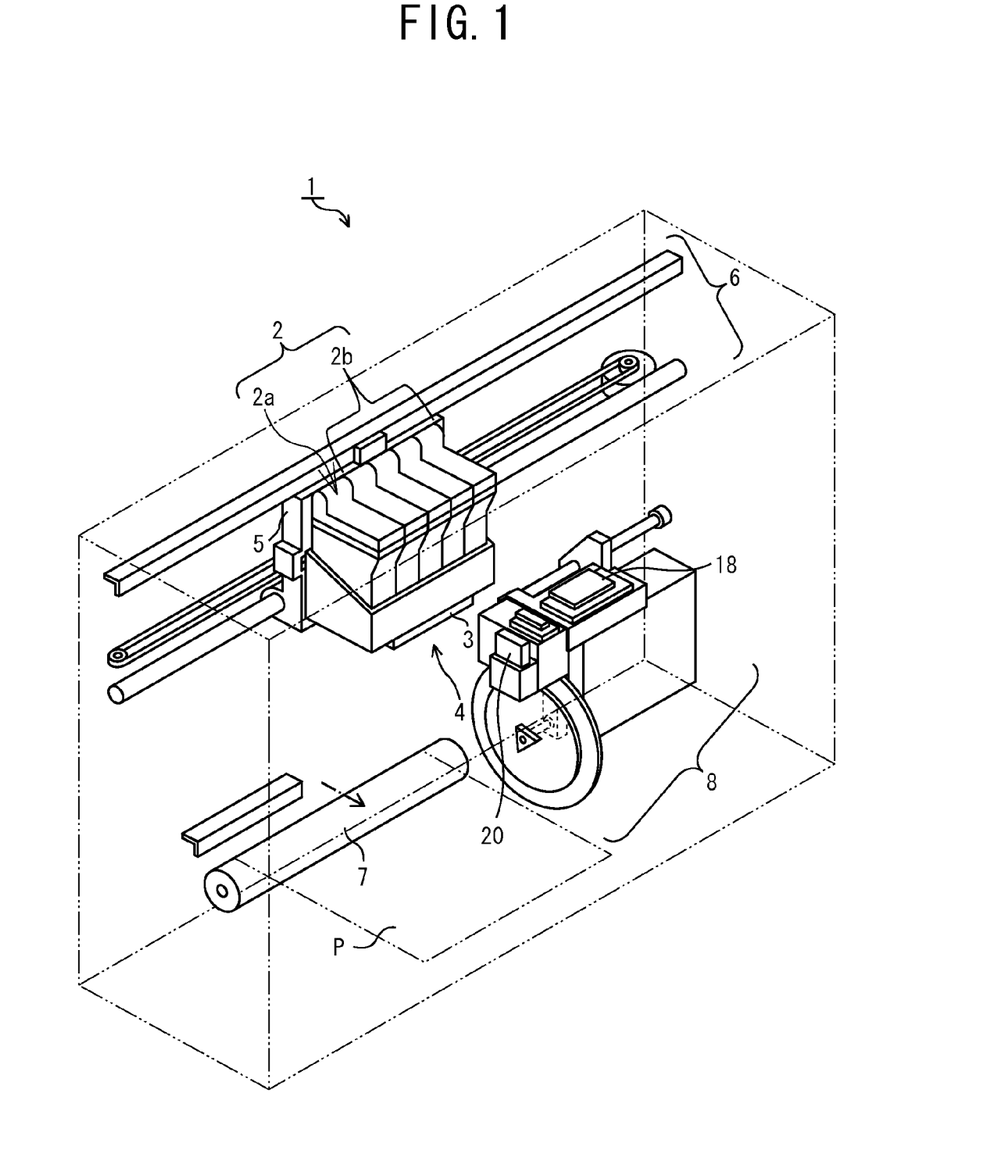
FIG. 1 is a schematic perspective view showing an example of a configuration of the ink-jet recording apparatus.

As shown in FIG. 1, an ink-jet recording apparatus 1 includes, as main components, an ink cartridge assembly 2, an ink-jet head 3 with a thermal ink-jet system, a head unit 4, a carriage 5, a drive unit 6, a platen roller 7, and a purge unit 8.

The ink cartridge assembly 2 includes a treatment liquid cartridge 2a and four water-based ink cartridges 2b. The treatment liquid cartridge 2a contains a treatment liquid in the above-mentioned ink set. The four water-based ink cartridges 2b contain water-based inks of four colors, namely, yellow, magenta, cyan, and black, respectively. At least one of the four water-based inks is a water-based ink in the above-mentioned ink set.

The head unit 4 is provided with the ink-jet head 3. The ink cartridge assembly 2 and the head unit 4 are mounted on the carriage 5. The drive unit 6 reciprocates the carriage 5 in a straight line. As the drive unit 6, a conventionally known drive unit may be used, for example (see JP 2008-246821 A, for example). The platen roller 7 extends in the reciprocating direction of the carriage 5 and is arranged so as to face to the ink-jet head 3.

The recording medium (for example, recording paper) P is fed from a paper feeding cassette (not shown) positioned on the side of or below the ink-jet recording apparatus 1. The recording medium P is introduced between the ink-jet head 3 and the platen roller 7. Then, the treatment liquid is applied to (ejected on) the introduced recording medium P from the ink-jet head 3.

Figure 2A:
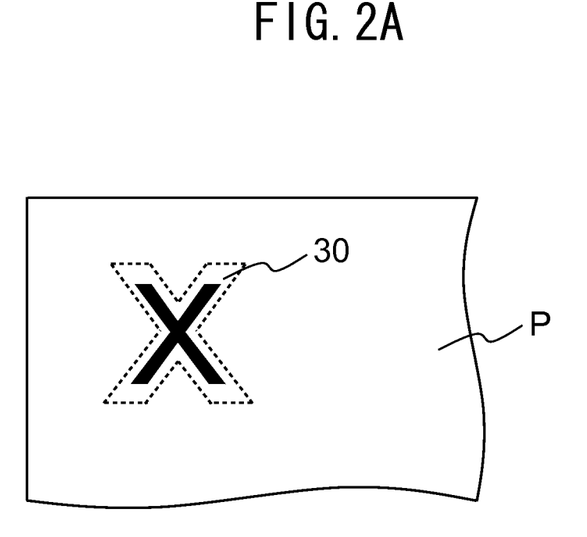
FIGS. 2A and 2B are illustrations showing examples of recording by the ink-jet recording method, respectively.
Figure 2B:
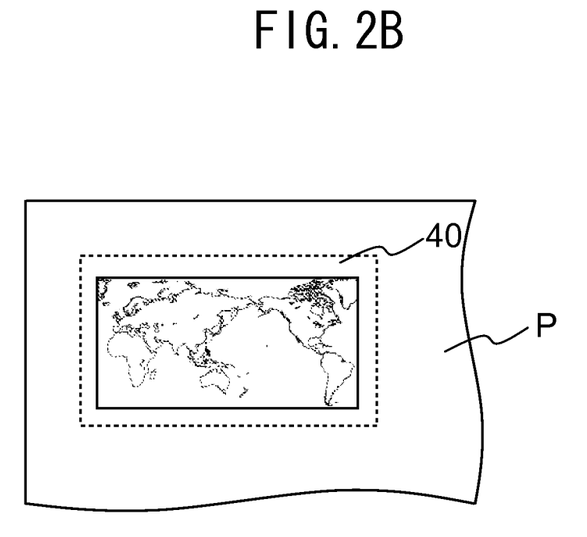

The treatment liquid may be applied to the whole or a part of a record surface of the recording medium. When the treatment liquid is applied to a part of a record surface of the recording medium, at least a part recorded with a water-based ink in a record surface of the recording medium is a part to which the treatment liquid is applied. When the treatment liquid is applied to a part of a record surface of the recording medium, the part to which the treatment liquid is applied may be bigger than the part recorded with a water-based ink. For example, as shown in FIG. 2A, when a character (X) is recorded on a recording medium P, the treatment liquid may be applied so that the part 30 to which the treatment liquid is applied is formed with a line having a wider line width than the character. Further, as shown in FIG. 2B, when a pattern is recorded on a recording medium P, the treatment liquid may be applied so that the part 40 to which the treatment liquid is applied is bigger than the pattern.

Next, the water-based ink is ejected from the ink-jet head 3 on the treatment liquid that has been applied on the recoding medium P. The time period between the ejection of the treatment liquid and that of the water-based ink is not particularly limited, and the ejection of the water-based ink may be performed in the same operation as the ejection of the treatment liquid.

The water-based ink may be ejected after the ejection of the treatment liquid as in the present example. Accordingly, for example, efficiency of aggregating a phosphate group-modified self-dispersing pigment in the water-based ink may be increased. Note here that the treatment liquid may be applied to a recording medium after the ejection of the water-based ink.

The recorded recording paper P then is discharged from the ink-jet recording apparatus 1. In FIG. 1, a feeding mechanism and a discharging mechanism of the recording medium P are not shown.

The purge unit 8 draws poor inks containing air bubbles and the like trapped inside the ink-jet head 3. As the purge unit 8, a conventionally known purge unit may be used, for example (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, in order to prevent the treatment liquid and the water-based ink from drying, a cap 18 covers a plurality of nozzles of the ink-jet head 3, which returns to the reset position after completion of the recording.

In the ink-jet recording apparatus 1 of the present example, the ink cartridge assembly 2 is mounted on one carriage 5 together with the head unit 4. In the ink-jet recording apparatus, the respective cartridges of the ink cartridge assembly 2 may be mounted on a carriage that is different from a cartridge on which the head unit 4 is mounted. Alternatively, the respective cartridges of the ink cartridge assembly 2 may not be mounted on the carriage 5, but may be arranged and fixed in the ink-jet recording apparatus. In such embodiment, for example, the respective cartridges of the ink cartridge assembly 2 are connected to the head unit 4 mounted on the carriage 5 via a tube or the like, and the treatment liquid and water-based inks are supplied to the head unit 4 from the respective cartridges of the ink cartridge assembly 2.

In the apparatus shown in FIG. 1, a serial-type ink jet head is employed, but the ink-jet recording apparatus may be an apparatus in which a line-type ink jet head is employed.

EXAMPLES

Next, the examples are described together with the comparative examples. Note here that the present invention is not limited by the following examples and comparative examples.

(Preparation of Treatment Liquid)

Components in treatment liquid composition (Table 2) were mixed uniformly, so that treatment liquids 1 to 12 were obtained. In Table 2, "proportion of monovalent metal ion" is the amount (wt %) of monovalent metal ion to be added with respect to the total amount of a treatment liquid assuming that a metal salt added to each treatment liquid is ionized 100%.

TABLE 1

|  | Water-based ink | | |
|---|---|---|---|
|  | 1 | 2 | 3 |
| Aqueous dispersion of phosphate group-modified self-dispersing pigment (*1) | 4.0 | — | — |
| Aqueous dispersion of carboxylic group-modified self-dispersing pigment (*2) | — | 4.0 | — |
| Aqueous dispersion of sulfonate group-modified self-dispersing pigment (*3) | — | — | 4.0 |
| Glycerin | 23.0 | 23.0 | 23.0 |
| Dipropylene glycol-n-propyl ether | 2.5 | 2.5 | 2.5 |
| SUNNOL ® NL1430 (*4) | 0.5 | 0.5 | 0.5 |
| Water | Balance | Balance | Balance |

(*1): The aqueous dispersion was prepared by the method described in JP 2009-515007 A, a number in table represents a solid content of pigment.

(*2): The aqueous dispersion was prepared by the method described in JP 2008-524400 A, a number in table represents a solid content of pigment.

(*3): The aqueous dispersion was prepared by the method described in JP 2008-524400 A, a number in table represents a solid content of pigment.

(*4): Sodium polyoxyethylene alkyl (C = 12, 13) ether sulfate (3E.O.), manufactured by Lion Corporation Unit of amount to be added: wt %

TABLE 2

| | Treatment liquid | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Na$_2$SO$_4$ | 9.5 | — | — | — | — | — | — | — | — | — | — | — |
| NaCl | — | 14.0 | — | — | — | — | — | — | — | — | — | — |
| NaNO$_3$ | — | — | — | 1.8 | 3.7 | 5.5 | 7.4 | 9.2 | 14.8 | 18.5 | 25.9 | 29.6 |
| K$_2$SO$_4$ | — | — | 6.5 | — | — | — | — | — | — | — | — | — |
| Glycerin | 12.8 | 12.8 | 12.8 | 12.8 | 12.8 | 12.8 | 12.8 | 12.8 | 12.8 | 12.8 | 12.8 | 12.8 |
| Triethylene glycol | 12.5 | 12.0 | 12.0 | 12.0 | 12.0 | 12.0 | 12.0 | 12.0 | 12.0 | 12.0 | 12.0 | 12.0 |
| Water | Balance | Balance | Balance | Balance | Balance | Balance | Balance | Balance | Balance | Balance | Balance | Balance |
| Proportion of monovalent metal ion | 3.1 | 5.5 | 2.9 | 0.5 | 1.0 | 1.5 | 2.0 | 2.5 | 4.0 | 5.0 | 7.0 | 8.0 |

Unit of amount to be added: wt %

(Preparation of Water-Based Ink)

Components except an aqueous dispersion of self-dispersing pigment in water-based ink composition (Table 1) were mixed uniformly, so that each ink solvent was obtained. Then the ink solvent was added to the aqueous dispersion of a self-dispersing pigment, and they were mixed uniformly. Thereafter a mixture thus obtained was filtered with a cellulose acetate membrane filter (with a pore size of 3.00 μm) manufactured by Toyo Roshi Kaisha, Ltd. Thus, the water-based inks for ink jet recording 1 to 3 were obtained.

Examples 1 to 12 and Comparative Examples 1 to 4

Ink sets were obtained by combining the water-based inks and the treatment liquids as summarized in Tables 3 to 5.

Optical densities (OD values) obtained in the examples and the comparative examples were measured and evaluated by the following methods.

Optical Density (OD Value) Evaluation

A treatment liquid in each of the ink sets of the examples and the comparative examples is spread evenly on plain papers using a bar coater (with a Rod No. 8, manufactured by YASUDA SEIKI SEISAKUSHO, LTD.). As the plain papers, Business (plain paper 1) and Recycled Supreme (plain paper 2) manufactured by XEROX Corporation, and Laser Print (plain paper 3) manufactured by Hammer Mill were used.

A single patch of black was recorded on the plain papers with each of the water-based inks in the respective ink sets of the examples and the comparative examples using a digital multi-function center DCP-385C on which an ink-jet printer mounted, manufactured by Brother Industries, Ltd. at a resolution of 600 dpi×600 dpi. Thus, evaluation samples were produced. Optical densities (OD values) of each of the evaluation samples were measured by a spectrocolorimeter, Spectrolino manufactured by GretagMacbeth (light source: $D_{50}$, viewing angle: 2°, Filter: Status T) and evaluated according to the following evaluation criteria. The measurement of the optical density (the OD value) was conducted three times with respect to each plain paper.

Evaluation Criteria 1 for Optical Density (OD Value) Evaluation
A: The optical density (the OD value) was 1.2 or more.
C: The optical density (the OD value) was less than 1.2.

Evaluation Criteria 2 for Optical Density (OD Value) Evaluation
A: The increase in optical density (OD value) was 0.05 or more with respect to a control to which a treatment liquid was not applied.
C: The increase in optical density (OD value) was less than 0.05 with respect to a control to which a treatment liquid was not applied.

Comprehensive Evaluation Criteria for Optical Density (OD Value) Evaluation
A: Both the evaluation results obtained by the evaluations according to the evaluation criteria 1 and 2 were A.
B: One of the evaluation results obtained by the evaluations according to the evaluation criteria 1 and 2 was A, and the other evaluation result was C.
C: Both the evaluation results obtained by the evaluations according to the evaluation criteria 1 and 2 were C.

The water-based inks and the treatment liquids in the respective ink sets of Examples 1 to 12 and Comparative Examples 1 to 4 and the evaluation results thereof are summarized in Tables 3 to 5. In Tables 3 to 5, the measurement result of optical density (OD) of each of the plain papers is an average value of the results of three-time measurements, and "average of three papers" means an average value of measurement results of the three papers, obtained by dividing the sum of the average values (of three-time measurements) of the plane papers 1 to 3 by 3. Further, evaluations according to the evaluation criteria 1 and 2 were conducted based on the "average of three papers".

TABLE 3

|  |  | Example 1 |  |  | Example 2 |  |  | Example 3 |  |  |
|---|---|---|---|---|---|---|---|---|---|---|
| Water-based ink |  | Water-based ink 1 |  |  | Water-based ink 1 |  |  | Water-based ink 1 |  |  |
| Modifying group of self-dispersing pigment |  | Phosphate group |  |  | Phosphate group |  |  | Phosphate group |  |  |
| Treatment liquid |  | Treatment liquid 1 |  |  | Treatment liquid 3 |  |  | Treatment liquid 2 |  |  |
| Proportion of monovalent metal ion (wt %) |  | 3.1 |  |  | 2.9 |  |  | 5.5 |  |  |
|  | Measurement result | Control | Treated | Increase | Control | Treated | Increase | Control | Treated | Increase |
| Optical density (OD value) | Plain paper 1 (*5) | 1.14 | 1.28 | 0.14 | 1.14 | 1.23 | 0.09 | 1.11 | 1.33 | 0.22 |
|  | Plain paper 2 (*6) | 1.12 | 1.22 | 0.10 | 1.12 | 1.19 | 0.07 | 1.07 | 1.33 | 0.26 |
|  | Plain paper 3 (*7) | 1.16 | 1.33 | 0.17 | 1.16 | 1.24 | 0.08 | 1.10 | 1.34 | 0.24 |
|  | Average of three plain papers | 1.14 | 1.28 | 0.14 | 1.14 | 1.22 | 0.08 | 1.09 | 1.33 | 0.24 |
|  | Evaluation 1 |  | A |  |  | A |  |  | A |  |
|  | Evaluation 2 |  | A |  |  | A |  |  | A |  |
|  | Comprehensive evaluation |  | A |  |  | A |  |  | A |  |
|  |  | Example 4 |  |  | Example 5 |  |  | Example 6 |  |  |
| Water-based ink |  | Water-based ink 1 |  |  | Water-based ink 1 |  |  | Water-based ink 1 |  |  |
| Modifying group of self-dispersing pigment |  | Phosphate group |  |  | Phosphate group |  |  | Phosphate group |  |  |
| Treatment liquid |  | Treatment liquid 4 |  |  | Treatment liquid 5 |  |  | Treatment liquid 6 |  |  |
| Proportion of monovalent metal ion (wt %) |  | 0.5 |  |  | 1.0 |  |  | 1.5 |  |  |
|  | Measurement result | Control | Treated | Increase | Control | Treated | Increase | Control | Treated | Increase |
| Optical density (OD value) | Plain paper 1 (*5) | 1.14 | 1.21 | 0.07 | 1.14 | 1.26 | 0.12 | 1.14 | 1.31 | 0.17 |
|  | Plain paper 2 (*6) | 1.13 | 1.26 | 0.13 | 1.13 | 1.31 | 0.18 | 1.13 | 1.33 | 0.20 |
|  | Plain paper 3 (*7) | 1.16 | 1.21 | 0.05 | 1.16 | 1.25 | 0.09 | 1.16 | 1.30 | 0.14 |
|  | Average of three plain papers | 1.14 | 1.23 | 0.09 | 1.14 | 1.27 | 0.13 | 1.14 | 1.31 | 0.17 |
|  | Evaluation 1 |  | A |  |  | A |  |  | A |  |
|  | Evaluation 2 |  | A |  |  | A |  |  | A |  |
|  | Comprehensive evaluation |  | A |  |  | A |  |  | A |  |

(*5) Business, manufactured by XEROX Corporation
(*6) Recycled Supreme, manufactured by XEROX Corporation
(*7) Laser Print, manufactured by Hammer Mill

TABLE 4

|  |  | Example 7 | | | Example 8 | | | Example 9 | | |
|---|---|---|---|---|---|---|---|---|---|---|
| Water-based ink | | Water-based ink 1 | | | Water-based ink 1 | | | Water-based ink 1 | | |
| Modifying group of self-dispersing pigment | | Phosphate group | | | Phosphate group | | | Phosphate group | | |
| Treatment liquid | | Treatment liquid 7 | | | Treatment liquid 8 | | | Treatment liquid 9 | | |
| Proportion of monovalent metal ion (wt %) | | 2.0 | | | 2.5 | | | 4.0 | | |
| | Measurement result | Control | Treated | Increase | Control | Treated | Increase | Control | Treated | Increase |
| Optical density (OD value) | Plain paper 1 (*5) | 1.14 | 1.30 | 0.16 | 1.14 | 1.32 | 0.18 | 1.14 | 1.33 | 0.19 |
| | Plain paper 2 (*6) | 1.13 | 1.34 | 0.21 | 1.13 | 1.34 | 0.21 | 1.13 | 1.35 | 0.22 |
| | Plain paper 3 (*7) | 1.16 | 1.32 | 0.16 | 1.16 | 1.33 | 0.17 | 1.16 | 1.34 | 0.18 |
| | Average of three plain papers | 1.14 | 1.32 | 0.18 | 1.14 | 1.33 | 0.19 | 1.14 | 1.34 | 0.20 |
| | Evaluation 1 | | A | | | A | | | A | |
| | Evaluation 2 | | A | | | A | | | A | |
| | Comprehensive evaluation | | A | | | A | | | A | |
|  |  | Example 10 | | | Example 11 | | | Example 12 | | |
| Water-based ink | | Water-based ink 1 | | | Water-based ink 1 | | | Water-based ink 1 | | |
| Modifying group of self-dispersing pigment | | Phosphate group | | | Phosphate group | | | Phosphate group | | |
| Treatment liquid | | Treatment liquid 10 | | | Treatment liquid 11 | | | Treatment liquid 12 | | |
| Proportion of monovalent metal ion (wt %) | | 5.0 | | | 7.0 | | | 8.0 | | |
| | Measurement result | Control | Treated | Increase | Control | Treated | Increase | Control | Treated | Increase |
| Optical density (OD value) | Plain paper 1 (*5) | 1.14 | 1.34 | 0.20 | 1.14 | 1.33 | 0.19 | 1.14 | 1.35 | 0.21 |
| | Plain paper 2 (*6) | 1.13 | 1.37 | 0.24 | 1.13 | 1.36 | 0.23 | 1.13 | 1.37 | 0.24 |
| | Plain paper 3 (*7) | 1.16 | 1.35 | 0.19 | 1.16 | 1.36 | 0.20 | 1.16 | 1.35 | 0.19 |
| | Average of three plain papers | 1.14 | 1.35 | 0.21 | 1.14 | 1.35 | 0.21 | 1.14 | 1.36 | 0.22 |
| | Evaluation 1 | | A | | | A | | | A | |
| | Evaluation 2 | | A | | | A | | | A | |
| | Comprehensive evaluation | | A | | | A | | | A | |

(*5) Business, manufactured by XEROX Corporation
(*6) Recycled Supreme, manufactured by XEROX Corporation
(*7) Laser Print, manufactured by Hammer Mill

TABLE 5

|  |  | Comparative Example 1 | | | Comparative Example 2 | | | Comparative Example 3 | | | Comparative Example 4 | | |
|---|---|---|---|---|---|---|---|---|---|---|---|---|---|
| Water-based ink | | Water-based ink 2 | | | Water-based ink 2 | | | Water-based ink 3 | | | Water-based ink 2 | | |
| Modifying group of self-dispersing pigment | | Carboxylic group | | | Carboxylic group | | | Sulfonate group | | | Carboxylic group | | |
| Treatment liquid | | Treatment liquid 1 | | | Treatment liquid 3 | | | Treatment liquid 1 | | | Treatment liquid 2 | | |
| Proportion of monovalent metal ion (wt %) | | 3.1 | | | 2.9 | | | 3.1 | | | 5.5 | | |
| | Measurement result | Control | Treated | Increase | Control | Treated | Increase | Control | Treated | Increase | Control | Treated | Increase |
| Optical density (OD value) | Plain paper 1 (*5) | 1.06 | 0.98 | −0.08 | 1.06 | 1.04 | −0.02 | 1.01 | 1.04 | 0.03 | 1.02 | 1.09 | 0.07 |
| | Plain paper 2 (*6) | 1.01 | 0.99 | −0.02 | 1.01 | 1.01 | 0.00 | 0.95 | 0.95 | 0.00 | 1.00 | 1.12 | 0.12 |
| | Plain paper 3 (*7) | 1.01 | 0.97 | −0.04 | 1.01 | 0.98 | −0.03 | 0.99 | 1.04 | 0.05 | 0.98 | 1.05 | 0.07 |
| | Average of three plain papers | 1.03 | 0.98 | −0.05 | 1.03 | 1.01 | −0.02 | 0.98 | 1.01 | 0.03 | 1.00 | 1.09 | 0.09 |
| | Evaluation 1 | | C | | | C | | | C | | | C | |
| | Evaluation 2 | | C | | | C | | | C | | | A | |
| | Comprehensive evaluation | | C | | | C | | | C | | | B | |

(*5) Business, manufactured by XEROX Corporation
(*6) Recycled Supreme, manufactured by XEROX Corporation
(*7) Laser Print, manufactured by Hammer Mill As summarized in Tables 3 and 4, the evaluation results in the optical density (OD value) evaluation were favorable in Examples 1 to 12. In contrast, as summarized in Table 5, the evaluation results in the optical density (OD value) evaluation was unfavorable in the ink sets of Comparative Examples 1 to 4, in which each water-based ink contains a carboxylic group-modified self-dispersing pigment or a sulfonate group-modified self-dispersing pigment as substitute for a phosphate group-modified self-dispersing pigment.

It will be obvious to those having skill in the art that many changes may be made in the above-described details of the particular aspects described herein without departing from the spirit or scope of the invention as defined in the appended claims.

What is claimed is:

1. An ink set, comprising:
   a water-based ink for ink jet recording; and
   a treatment liquid, wherein
   the water-based ink comprises a phosphate group-modified self-dispersing pigment, water, and a water-soluble organic solvent, and
   the treatment liquid comprises sodium nitrate in an amount of 1 wt % or more with respect to a total amount of the treatment liquid, water, and a water-soluble organic solvent.

2. The ink set according to claim 1, wherein
   the amount of sodium nitrate with respect to a total amount of the treatment liquid is in a range of about 2 wt % to 10 wt %.

3. The ink set according to claim 1, wherein the water-based ink comprises dipropylene glycol-n-propyl ether, and the treatment liquid comprises triethylene glycol.

4. The ink set according to claim 1, wherein the amount of the phosphate group-modified self-dispersing pigment in water-based ink is about 4 wt. %.

5. The ink set according to claim 1, wherein the amount of sodium nitrate ranges from 3.7 wt. % to 29.6% based on the total weight of the treatment liquid.

6. The ink set according to claim 1, wherein the amount of sodium ion derived from sodium nitrate relative to the total amount of the treatment liquid ranges from 5 wt. % to 8 wt. %.

7. The ink set according to claim 1, wherein the amount of the sodium nitrate with respect to the total amount of the treatment liquid is 18.5 wt. % to 29.6 wt. %.

8. The ink set according to claim 1, wherein
   the phosphate group-modified self-dispersing pigment is present in an amount "B" by weight relative to a total weight of the water-based ink; and
   the sodium nitrate ion is present in a proportion "A" with respect to a total amount of the treatment liquid;
   wherein the proportion "A" of the sodium nitrate ion in the treatment liquid and the amount "B" of the phosphate group-modified self-dispersing pigment in the water-based ink satisfy the following relationships (i) and (ii):

$$A/B = 0.25 \text{ to } 2 \quad \text{(i)}$$

$$A+B = 5 \text{ to } 12 \quad \text{(ii)}.$$

9. An ink-jet recording apparatus, comprising:
   an ink set storing portion;
   a treatment liquid applying unit; and
   an ink-jet head, wherein
   the ink set storing portion stores the ink set according to claim 1,
   a treatment liquid in the ink set is applied to a recording medium by the treatment liquid applying unit, and
   a water-based ink in the ink set is ejected on the recording medium from the ink-jet head.

10. The ink jet recording apparatus according to claim 9, wherein
    the ink-jet head also serves as the treatment liquid applying unit.

11. The ink jet recording apparatus according to claim 9, wherein
    the ink-jet head is an ink-jet head with a thermal ink-jet system.

12. An ink jet recording method, comprising:
    a treatment step of applying a treatment liquid to a recording medium, and
    a recording step of performing recording by ejecting a water-based ink on the recording medium using an inkjet system, wherein
    as the water-based ink, the water-based ink in the ink set according to claim 1 is used, and
    as the treatment liquid, the treatment liquid in the ink set according to claim 1 is used.

13. The inkjet recording method according to claim 12, wherein
    in the treatment step, the treatment liquid is applied to the recording medium by ejecting the treatment liquid using the ink-jet system.

14. The ink-jet recording method according to claim 12, wherein
    the ink-jet system is a thermal ink-jet system.

15. The ink-jet recording method according to claim 12, wherein
    recording is performed on a part of the recording medium, to which a treatment liquid is applied, with the water-based ink.

* * * * *